Oct. 3, 1933.  F. S. BUNKER  1,928,644
DRIFT MEASURING AND RECORDING APPARATUS
Filed Sept. 8, 1930  4 Sheets-Sheet 1
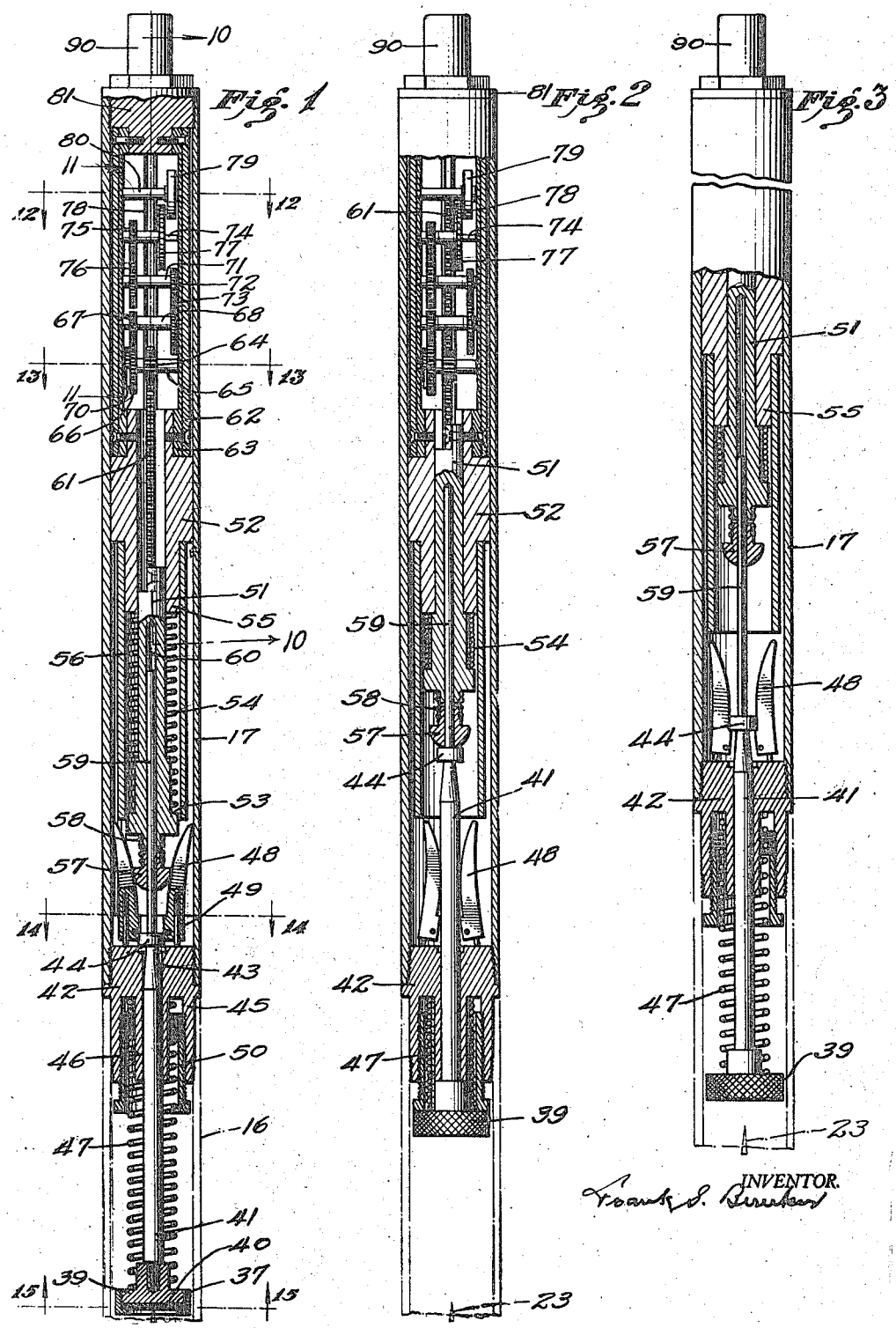
INVENTOR.
Frank S. Bunker

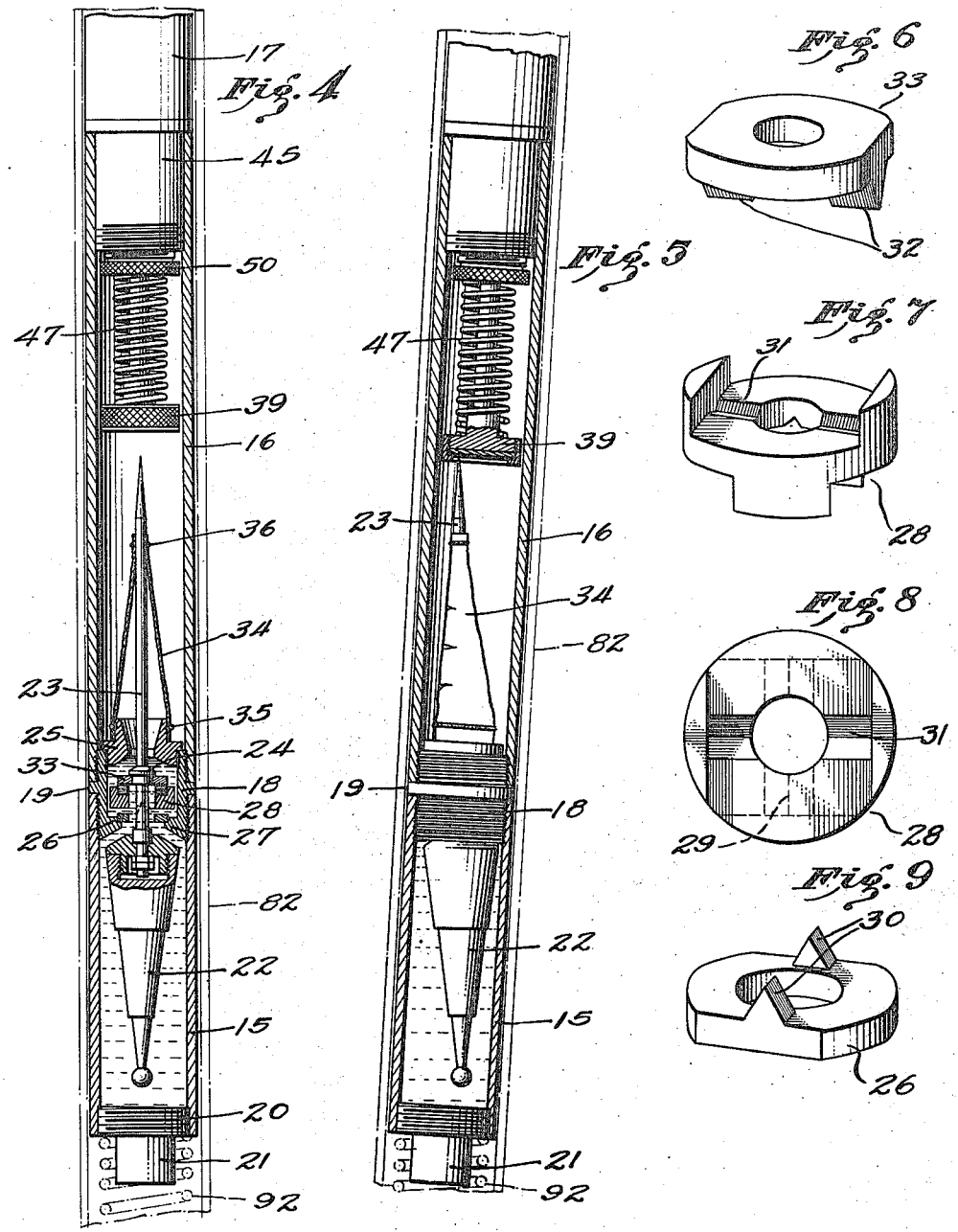

Oct. 3, 1933.  F. S. BUNKER  1,928,644
DRIFT MEASURING AND RECORDING APPARATUS
Filed Sept. 8, 1930   4 Sheets-Sheet 3
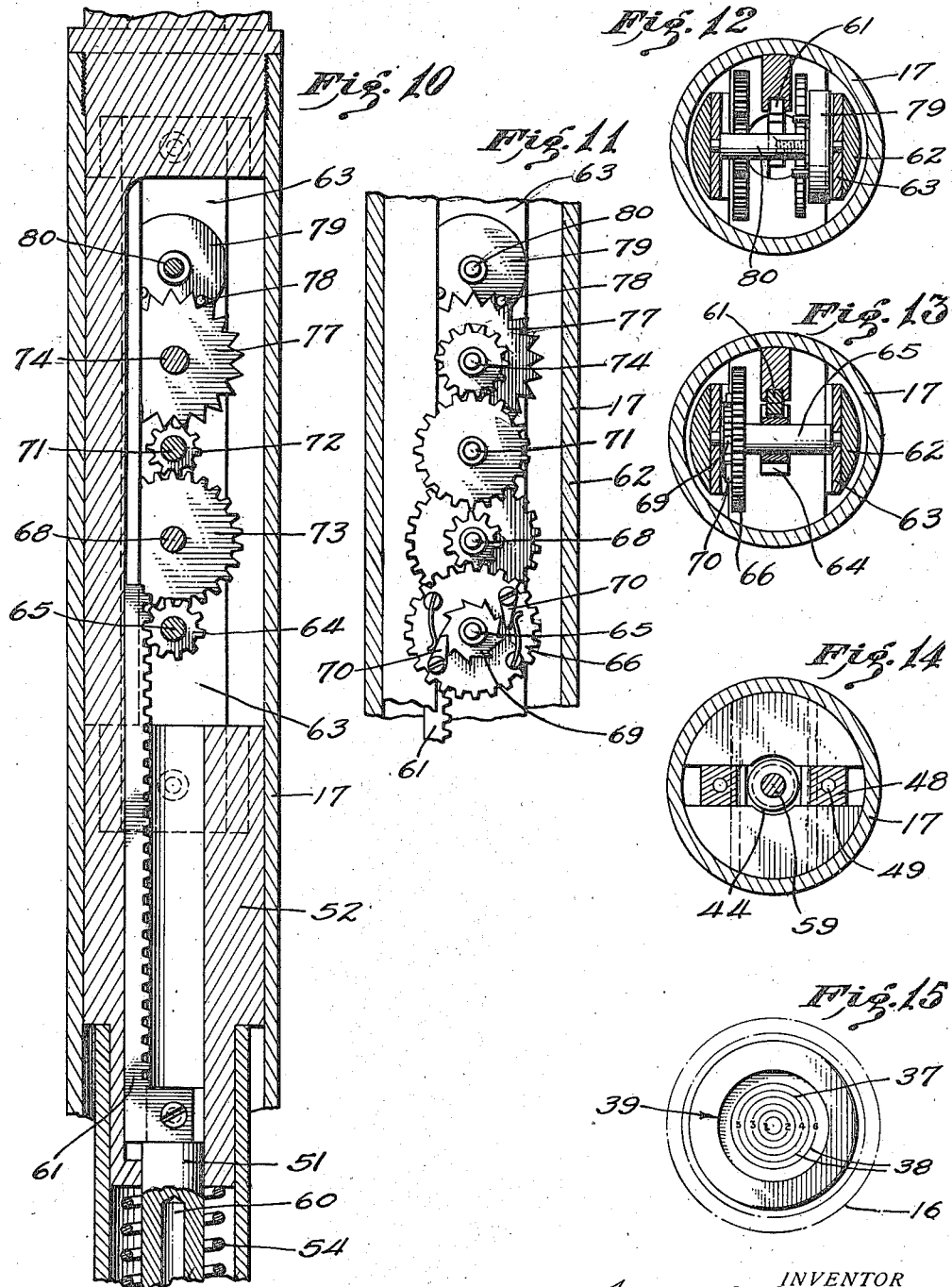
INVENTOR
Frank S. Bunker.

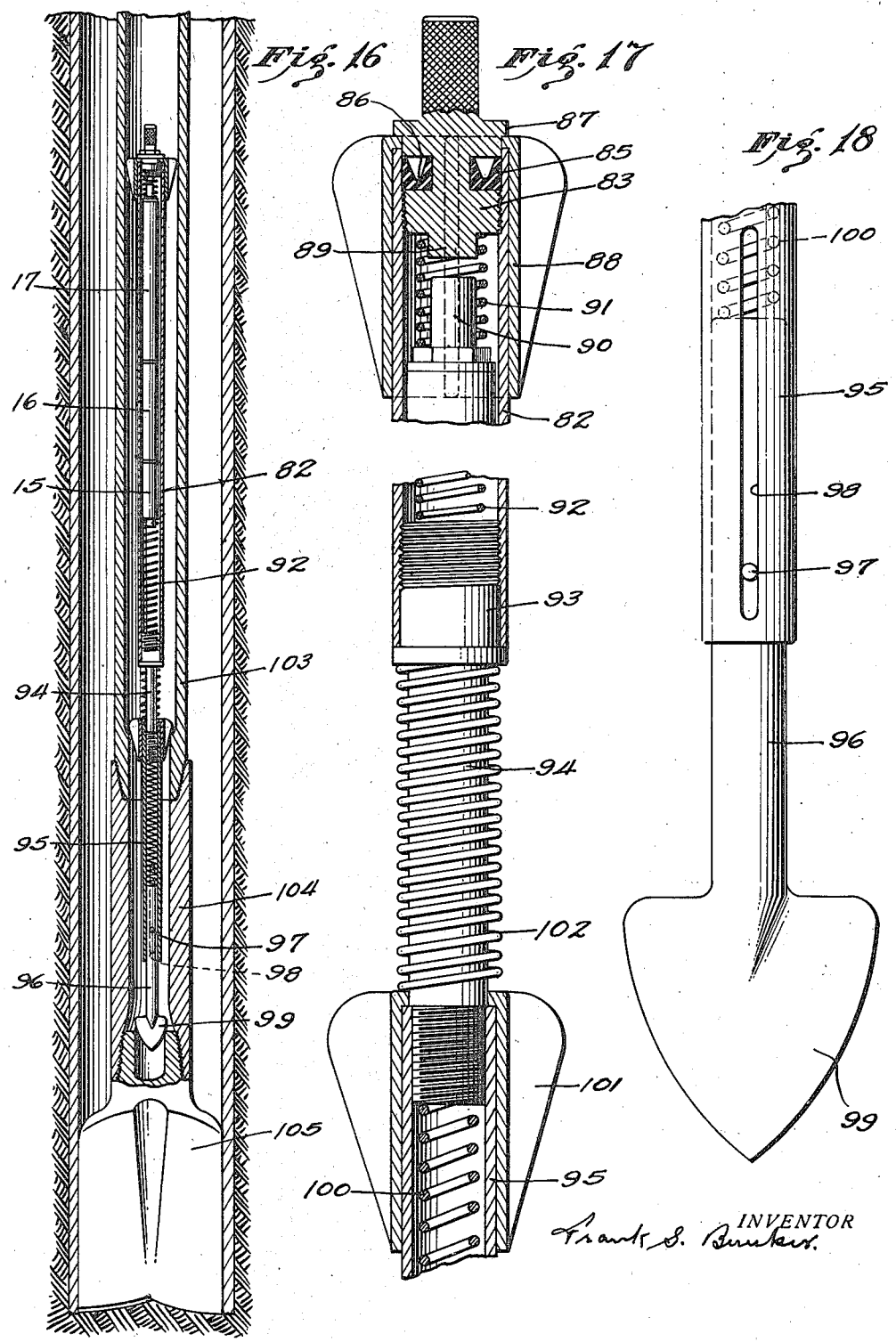

Patented Oct. 3, 1933

1,928,644

UNITED STATES PATENT OFFICE 1,928,644

DRIFT MEASURING AND RECORDING APPARATUS

Frank S. Bunker, Compton, Calif., assignor to Technical Oil Tool Corporation, Ltd., Los Angeles, Calif., a corporation Application September 8, 1930. Serial No. 480,346

14 Claims. (Cl. 234—1)

My invention relates to apparatus for use in oil wells and the like for measuring and recording the drift or inclination of a hole from the vertical, and it has for a purpose the provision of such an apparatus which is characterized from similar apparatus heretofore proposed in the following respects:

A measuring and recording mechanism which embodies a chart and a marker or punch therefor, one of which is maintained in vertical position in a well hole while the other is positioned in accordance with the drift or inclination of the hole from the vertical so that when the two are brought into engagement with each other, the marker will inscribe on the chart the inclination of the hole from the vertical; a measuring and recording mechanism which is further characterized by its compactness and durability of construction to permit of its being dropped through a drill pipe of even the smallest diameter used in the drilling of oil wells and into a position immediately adjacent the drill bit in order that the recording mechanism can and will measure the amount of inclination of the hole at a point in close proximity to the bottom thereof; a run-down device for actuating the measuring and recording mechanism a predetermined time after the mechanism has been dropped into the drill pipe so that all movable parts of the mechanism set into motion as a result of its descent and final and sudden checking of its downward movement, will be given ample opportunity to come to a standstill before being actuated to record the drift of the hole for the purpose of rendering the measuring and recording of the drift absolutely accurate; and a carrier for the mechanism and run-down device in which the two are effectively housed and cushioned against damage as a result of the force of impact when striking the drill pipe joints during descent and the final impingement of the carrier against the drill bit, the carrier including means for centering it in the drill pipe during and following descent in order that its complete traverse of the drill pipe and its final positioning adjacent the drill bit is assured.

I will describe only one form of drift measuring and recording apparatus embodying my invention, and will then point out the novel features thereof in claims.

In the accompanying drawings:

Figure 1 is a view showing in vertical longitudinal section one form of run-down device, container therefor, and a part of the measuring and recording mechanism included in the apparatus embodying my invention.

Figure 2 is a view similar to Figure 1 showing the positions of the parts of the run-down device and the adjacent part of the measuring and recording mechanism which they assume when the device is wound, as distinguished from the unwound or run-down position of the device as illustrated in Figure 1.

Figure 3 is a view similar to Figure 2 showing what may be termed the intermediate position of the run-down device, or that position which it assumes just preceding the tripping and actuation of the measuring and recording mechanism.

Figure 4 is a fragmentary vertical sectional view of the container of the apparatus showing the reminder of the measuring and recording mechanism embodying my invention and which, in effect is a continuation of Figure 3.

Figure 5 is a view similar to Figure 4 but distinguished from the latter in that the drill pipe is inclined with respect to the vertical and showing the parts of the recording mechanism in the positions which they assume as a result of such inclination, and with the punch of the mechanism in punching position with respect to the chart.

Figures 6, 7, 8, and 9 are detail views of the respective parts of the universal joint for suspending the plumb bob as illustrated in Figure 4.

Figure 10 is an enlarged vertical sectional view taken on the line 10—10 of Figure 1 and looking in the direction of the arrows.

Figure 11 is a similar view taken on the line 11—11 of Figure 1 and looking in the direction of the arrows.

Figures 12, 13, and 14 are transverse sectional views taken on the lines 12—12, 13—13, and 14—14 of Figure 1.

Figure 15 is a view showing in bottom plan the chart holding head and chart illustrated in Figure 1 in section on line 15—15 of Fig. 1.

Figure 16 is a view showing in vertical section a well hole and drill pipe, with my measuring and recording apparatus in applied position therein.

Figure 17 is an enlarged fragmentary vertical sectional view of the carrier illustrated in Figure 16.

Figure 18 is a continuation of Figure 17 but showing the remainder of the carrier in elevation.

Similar reference character refer to similar parts in each of the several views.

Measuring and recording apparatus

In describing this mechanism, reference will be had to Figures 4 to 9. A tubular container C is provided, which is made up of a lower section 15, an intermediate section 16, and an upper section 17. As best illustrated in Figures 4 and 5, the lower section is connected to the intermediate section by a coupling member 18 of tubular form and exteriorly threaded to have threaded engagement with the interior of the sections 15 and 16. The periphery of the member 18 is provided with an annular collar 19 which is adapted to be interposed between the sections so as to limit the threading of the sections on the member. The lower section 15 is closed by a screw plug 20 having a boss 21 for centering a spring, as will be hereinafter described. This plug 20 coacts with the section 15 to provide a receptacle in which a suitable liquid, such as glycerin and alcohol, is contained for the purpose of rendering movement of a weight 22 disposed in the receptacle, extremely sluggish. This weight constitutes a counter balance and is suspended for swinging movement from the member 18 through the provision of a joint and in such manner that the weight is capable of universal movement to assume and maintain a true vertical position irrespective of the inclination in position of the member 18. A rod 23 is suitably secured to the upper end of the weight 22, and this rod is provided with a collar 24 by means of which it is suspended from the afore-mentioned joint. Beyond the collar 24, the rod 23 is extended upwardly through a part 25 threaded on the upper end of the coupling member 18, the upper end of the rod being pointed and constituting a punching instrument.

The aforesaid joint is made up of three members illustrated in detail in Figures 6, 7, 8, and 9, and which members are associated one with the other to allow of a universal movement of the rod 23 and hence a corresponding movement of the weight 22. The lower joint member 26 (Figure 9) is provided with a central opening through which the rod 23 freely extends, and this member is supported on a flange 27 formed interiorly of the coupling member 18. Supported on the member 26 is the intermediate joint member 28, and which member, as illustrated in Figures 7 and 8, is provided with a central opening through which the rod 23 freely extends. The lower side of the member 28 is provided with V-shaped grooves 29 in which V-shaped trunnions 30 formed on the lower member 26 are received. On the upper side of the member 28 similar grooves 31 are formed, but at right angles to the grooves 29, and these grooves 31 receive V-shaped trunnions 32 on the lower side of the upper joint member 33. The collar 24 on the rod 23 engages the upper member 33 so that in reality the rod is suspended from this member.

By reason of the tongues and grooves just described, the rod and its weight are free to assume and maintain a vertical position, a function necessary to the successful operation of the measuring and recording mechanism.

The weight 22 is structurally characterized by being formed in the shape of a cone in order that it may maintain a vertical position even when the drill pipe in which it operates is at a decided inclination, and without coming in contact with the inner wall of the receptacle 15.

As stated before, the receptacle 15 contains a liquid to render movements of the weight 22 sluggish, and also for the purpose of lubricating the parts of the joint so that the weight will at all times assume vertical position. To prevent the escape of the liquid from the coupling member 18, that portion of the rod 23 extending above the casting 25 is inclosed in a covering 34 of any suitable material which is flexible and impervious to liquid. This covering 34 is of conical form, as illustrated in Figures 4 and 5, in order that it may not interfere with movements of the marker or punching instrument 23. Its lower end is attached by a cord 35 to the casting 25, and its upper end is attached to the rod 23 likewise by a cord 36.

In addition to the counter balance and punching instrument, the measuring and recording mechanism also includes a chart 37. This chart, as shown in Figure 15 is of disk form and preferably constructed of celluloid, its lower face having inscribed thereon concentric circles 38, with each circle representing one degree. The chart 37 is contained in a holding head 39 comprising a disk on which a flanged collar is threaded, the collar coacting with the disk to clamp the marginal edge of the chart, and also a backing disk 40 which is formed of any suitable material that functions to fixedly secure the point of the punching instrument once it penetrates the chart and embeds itself in the disk. Lead or soft alloys may be employed for the purpose.

The holding head 39 is mounted on the lower end of a rod 41, and this rod is slidable vertically in a coupling member 42 for coupling the intermediate section 16 of the container to the upper section 17. The upper end of the rod 41 is tapered as indicated at 43, and this tapered portion terminates in a keeper head 44. Depending from the lower side of the member 42 is a tubular extension 45 concentric of a smaller and tubular extension 46 in which latter the rod 41 slides. An expansible spring 47 is interposed between the head 39 and the member 42 which urges the head and rod downwardly so that normally the rod and head assume the positions illustrated in Figure 1. However, the rod and head can be manually moved to the elevated position shown in Figure 2 when sufficient upward pressure is exerted against the head to overcome the tension of the spring 47. The rod and head are also adapted to assume an intermediate position between the two aforedescribed positions, and in which position the keeper head 44 is engaged by a pair of pivoted latches 48 urged by means of spring pressed pins 49 inwardly to engage the keeper head, as illustrated in Figure 3, and to thereby hold the rod against descent under the action of the spring 47.

The upper extreme position of the rod 41 can be varied in accordance with adjustment of a sleeve 50 threaded within the extension 45 and disposed in the path of movement of the head 39.

*Run-down device*

A run-down device is embodied in my apparatus for the purpose of operating the latches 48 to cause them to disengage the keeper head 44 so that the spring 47 can function to project the holding head 39 downwardly and thus cause the chart 37 to be pierced by the punching instrument 23 for effecting measurement and recordation of the drift of the well hole from the vertical. This device, in the present instance, comprises an actuator or plunger 51 movable vertically in a casting 52, and provided at its lower end with a shoulder 53 which forms an abutment for the lower end of a coiled expansible spring 54. The upper end of the spring 54 abuts a tubular extension 55 of the casting 52, and a tube 56 is secured to the extension 55 so as to depend therefrom and to thereby form a housing for the spring 54. This tube also provides a guide for the plunger 51, the latter being enlarged at its lower end so as to have a sliding fit within the two. The spring 54 serves to urge the plunger downwardly to cause a nose 57 of semi-spherical form to engage and move the pawls 48 free of the keeper head 44 so that the rod 41 can be projected downwardly under the action of the spring 47. This nose 57 is formed separately from the plunger 51 and secured thereon by a coil spring 58, the spring being disposed in grooves on the plunger and nose, and serving to center the nose in respect to the latches 48 so that when the plunger is moved down, the nose will engage and release the two latches simultaneously.

For guiding the plunger in its vertical movement as well as the rod 41, a supplemental rod 59 is fixed on the upper end of the rod 41 so as to have a loose sliding fit in a pocket 60 of the plunger 51. The upper end of the plunger is secured to a rack bar 61, and this rack bar is of such length as to extend above the casting 52 and into a tubing 62 secured to the casting. This tubing 62 is provided with a frame 63 which provides a mounting for a mechanism for regulating movement of the rack bar 61, and which mechanism will now be described.

The mechanism comprises a gear 64 which constantly meshes with the rack bar 61. This gear is fixed to a shaft 65 journaled in the frame 63, and loosely mounted on the shaft is a second and larger gear 66 meshing with a smaller gear 67 on a shaft 68. The shaft 65 has a ratchet wheel 69 fixed thereto, and a gear 66 is provided with a pair of spring pressed pawls 70 adapted to engage the teeth of the wheel 69 when the latter is rotated in one direction only to set up an operative connection between the ratchet wheel and the gear so that rotation of the shaft 65 in one direction will be transmitted to the gear 66 and thus conveyed to the shaft 68 through the gear 67. A third shaft 71 is operatively connected to the shaft 68 by gears 72 and 73, and a fourth shaft 74 is operatively connected to the shaft 71 by gears 75 and 76. On the shaft 74 is a toothed wheel 77 engaged by lugs 78 on a weighted wheel 79 rotatable on a shaft 80. The wheels 77 and 79 coact with the lug 78 to provide an escapement for controlling rotation of the shaft 74, and through the train of gearing just described, it should be manifest that this escapement also functions to control downward movement of the rack bar 61. The control is such that the downward movement of the rack bar is made relatively slow in order that its downward stroke may be caused to consume a predetermined period of time, as will be more fully described hereinafter. It will be observed that the pawls 70 and the ratchet wheel 69 permit unrestricted movement of the rack bar upward, for when the shaft 65 is rotated by the rack bar, its motion is not transmitted to the gear 66, and hence the remainder of the gear train is not actuated.

It is important to note that the pawls 70 are positioned in respect to the teeth of the ratchet wheel 69 so that irrespective of the circumferential position of the wheel either one pawl or the other is in full engagement with one tooth of the wheel. Thus, when the rack bar is moved to its uppermost position an operative connection between the ratchet wheel and the gear 66 will be immediately established and without permitting any downward movement of the rack bar before such connection is established. This is important in the operation of the run-down device for the reason that the device when wound will consume a predetermined period of time before the rack bar reaches its lowermost position or a position in which the head of the actuator has moved the latches free of the keeper head to release the rod 41, and thereby effect operation of the measuring and recording mechanism.

The upper end of the container section 17 is closed by a screw plug 81 (Figure 1), and as this plug is secured to the tube 56 and the frame 63, it will be manifest that the entire mechanism is capable of being removed from the container section. Also, the plug serves to suspend the entire run-down device within the container and to seal the upper end of the container against the admission of fluid.

*Carrier*

In the use of the aforedescribed measuring and recording mechanism and run-down device, the two are adapted to be dropped as one into a drill pipe and to occupy a position in close proximity to the drill bit at the lower end of a pipe in order that the mechanism can and will measure and record the amount of drift of the hole at a point adjacent to the bottom thereof. In this manner a true measurement of the inclination of the hole from the vertical is effected at the point at which the bit is working, rather than at a distance above the bit which naturally gives a false indication as to the drift of the hole.

For the purpose of conveying the mechanism and run-down device downwardly through the drill pipe, I provide a carrier which includes a tubular housing 82 in which the container is adapted to be inserted. As illustrated to advantage in Figure 17, the upper end of the housing is closed by a screw plug 83 having an annular groove 84 therein in which is received a packing ring 85. This packing ring is formed with a V-shaped groove 86 in order that any fluid attempting to enter the housing will expand the ring tightly against the wall of the housing and tightly against the inner wall of the groove, thereby sealing these joints against the admission of fluid. The plug 83 is provided with a shouldered extension 87 which is utilized to secure a centering head 88 on the upper end of the housing. This centering head is of fin form with the fins thereof tapered in width as illustrated. A head of this form is provided for the purpose of maintaining the upper end of the housing centered within the drill pipe as illustrated in Figure 16, and yet allow the free passage of the head through each joint of the drill pipe.

As shown in Figure 17, the lower end of the plug 83 is provided with a boss 89 which coacts with a boss 90 on the plug 81 to center a spring 91 between the two plugs, this spring serving to cushion any upward movement of the container in the housing. To cushion downward movement of the container in the housing, a spring 92 is provided and this spring is interposed between the lower end of the container in encircling relation to the boss 21. The lower end of the spring 92 engages a screw plug 93 on the upper end of a rod 94, the latter depending from the lower end of the housing 82 and providing a connection with a guiding spear. This spear includes a tubular upper section 95 into which the lower end of the rod 94 is threaded. It also includes a lower and solid section 96 which is slidable in the upper section and retained against displacement therefrom by means of pins 97 working in slots 98. The lower end of the spear section 96 is formed with a head 99 which is adapted to seat within the upper end of a drill bit, as illustrated in Figure 16. A spring 100 is interposed between the rod 94 and the lower section 96, and this spring serves to cushion upward movement of the lower section, as will be understood.

A second centering head 101 is loosely mounted on the rod 94 but urged downwardly on the upper spear section 95 by a spring 102. Thus it will be seen that the spring serves to cushion upward movement of the centering head 101 to prevent its striking against the plug 93. This centering head is of the same construction as the head 88, and is adapted to abut the lower restricted end of the drill pipe and to thereby coact with the spear head 99 in limiting downward movement of the apparatus as a whole within the drill pipe and drill collar. It will be understood that the head 101 engages the restricted portion of the drill pipe in advance of the head 99 engaging the drill pipe so as to reduce the force of impact of the spear head against the drill bit.

The operation of the apparatus is as follows:

The run-down device is wound and the chart 37 set before attaching the lower container section 15 to the intermediate section 16, and this is accomplished by standing the container upright and exerting sufficient pressure downward on the head 39 to force the latter upward from the position shown in Figure 1 to that shown in Figure 2. Such a manual operation compresses the spring 47, elevates the rod 41, the extension 55, and the plunger 51 to compress the spring 54. During this operation, the rack bar 61 is elevated a distance depending upon the adjustment of the sleeve 50 for, as previously explained, the length of the up stroke of the rod 41 is determined by adjustment of the sleeve 50 which it abuts. The spring 47 is also compressed by upward movement of the head 39, but when pressure is removed from the head, the spring expands to lower the rod 41 until the keeper 44 is engaged by the latches 48, when its downward movement is checked. This checking occurs before the rod 41 has reached the lower end of its downward stroke in order to maintain the chart 37 out of engagement with the punching instrument and also to maintain the spring 47 under tension to effect the final thrust of the chart against the instrument.

Thus, with the run-down device and measuring and recording mechanism set as just described, the lower section 15 is now screwed onto the intermediate section 16 and the entire container placed into the housing 82, it being understood that this may be accomplished by removing either the plug 83 or the plug 93 and inserting the container into one end or the other of the housing. Once the container is inserted into the housing either plug 83 or 93 is reapplied together with the respective spring so that the container is resiliently supported within the housing. Thus, with the container within the housing and the parts of the carrier assembled, as illustrated in Figure 16, the apparatus is now ready to be dropped into the drill pipe.

As the apparatus proceeds downward in the drill pipe, the centering head 88 serves to center the carrier in respect to the drill pipe, and the heads 88 and 101 co-act to insure free movement of the carrier past the several joints of the drill pipe, until finally, the carrier reaches the lower end of the drill pipe or to the position illustrated in Figure 16. In this position, the head 101 abuts the shouldered end of the drill pipe indicated at 103, with the spear extending into the drill collar 104, and the head 99 abutting the upper end of the drill bit 105.

It will be understood that the run-down device having been set before the apparatus was dropped into the drill pipe, that this device has been operating during its descent within the drill pipe. In other words, the spring 54 intending to return to its normal position urges the rack bar 61 downwardly, but its movement is retarded through the medium of the gear train and the escapement, all in a manner to consume a predetermined period of time before the rack bar reaches the bottom of its stroke. Under this downward movement of the rack bar, the plunger 51 together with its nose 57 is moved downwardly until the nose engages the latches 48 when the latter are moved outwardly as illustrated in Figure 1, to cause them to disengage the keeper 44 and thus release the rod 41. Once the rod is released, the spring 47 functions to drive the head 39 downwardly to cause the punching instrument 23 to penetrate the chart 37 and embed itself in the disk 40, in the manner illustrated in Figure 5. Any possible movement of the point of the instrument in the chart is prevented by the continued pressure of the head 39 against the instrument because the spring 47 is still under tension.

If the drill pipe is inclined from the vertical as illustrated in Figure 5, it will now be manifest that the position of the chart in respect to the punching instrument will be such as to measure the degree of inclination, and consequently, when the punch pierces the chart, a recordation of the inclination is made.

As the sleeve 50 determines the length of the upward stroke of the rack bar 61, it will be manifest that the length of downward stroke of the rack bar is accordingly regulated, and as the run-down device regulates the speed of movement of the rack bar downwardly, the time required for the nose 58 to engage and release the latches 48 is varied accordingly. This variation in time in which the run-down device releases the chart is for the purpose of compensating for wells of different depths, and in such manner that the chart will be released only after the apparatus has descended to the bottom of the drill pipe and all moving parts therof, particularly the punching instrument have come to rest in order that a true measurement and recordation of the drift or inclination can be made. Thus, it will be understood, that as the depth of the hole increases, the length of the downward stroke of the rack bar is accordingly increased, thereby insuring that the measuring and recording mechanism will be actuated only after the apparatus has reached the bottom of the hole and the punching instrument has come to a standstill.

Although I have herein shown and described only one form of drift measuring and recording apparatus embodying my invention, it is to be understood that various changes and modifications may be made therein without departing from the spirit of the invention and the spirit and scope of the appended claims.

I claim:

1. An apparatus of the character described comprising a drift recording mechanism including a punching instrument having means associated therewith for maintaining the latter in vertical position, and a chart movable upward and downward from said instrument, means for biasing the chart downward, means for latching the chart in an elevated position and spaced from the instrument, and time controlled means for actuating said latching means to release the chart and thus permit said biasing means to force the chart downwardly against the instrument.

2. An apparatus of the character described comprising a container having a cross sectional area to permit of its being dropped into a drill pipe so as to traverse the latter and be positioned adjacent the drill bit, a normally inactive drift recording mechanism in the container, and a run-down device in the container for rendering said mechanism active only after said container has been positioned adjacent the drill bit and all parts of said mechanism have come to a standstill.

3. An apparatus as embodied in claim 2 wherein means is positioned in the container for yieldingly suspending the mechanism and device within the container to prevent damage thereto under the force of impact produced when the container strikes the tool joints of the drill pipe and the drill bit.

4. An apparatus as embodied in claim 2 wherein springs are arranged at the opposite ends of the mechanism and device to be interposed between the latter and the ends of the container to resiliently support the mechanism and device within the container.

5. An apparatus of the character described comprising a container having a cross sectional area to permit of its being dropped into a drill pipe so as to traverse the latter and be positioned adjacent the drill bit, means acting to center the container in a drill pipe, a spear yieldingly connected to the leading end of the container and adapted to abut a drill bit, a drift recording mechanism in the container normally inactive, and a run-down device in the container for rendering said mechanism active only after said container has been positioned adjacent the drill bit.

6. In a drift recording mechanism, a support, a receptacle suspended from the support and adapted to contain a liquid, a universal joint in the support, a weight suspended from said joint and of inverted conical form, and a punching instrument extending upwardly from the joint and movable by and with the weight, and flexible means correlated with the support and instrument for sealing the instrument and support against the expulsion of liquid.

7. In a drift recording mechanism, a support, a receptacle depending from the support and in which a liquid is adapted to be contained, and a universal joint in the support and comprising a lower member, an intermediate member, and an upper member, the intermediate member having therein grooves at right angles to each other upon the opposite faces thereof, and the upper and lower members having trunnions mounted in the respective grooves, and a weight disposed at the lower side of the joint and suspended from the upper member.

8. An apparatus of the character described comprising a drift recording mechanism including a punching instrument, means acting to maintain the punching instrument in vertical position when within a drill pipe, and a chart having a rod movable to cause the chart to engage or disengage the punching instrument, a spring for urging the rod toward the punching instrument and the chart into engagement with the punching instrument, a keeper member on the rod, latches mounted adjacent the rod to engage the keeper and maintain the chart out of engagement with said instrument, an actuator engageable with said latches for releasing said rod, and a spring for urging the actuator into engagement with said latches.

9. An apparatus as embodied in claim 8 wherein the actuator is provided with a nose loosely mounted on the actuator and having means for centering the nose on the actuator.

10. An apparatus as embodied in claim 8 wherein the rod is longitudinally alined and engageable with the actuator so that by movement of the rod said actuator is moved against the tension of its respective spring, and a member disposed in the path of movement of the chart for determining the uppermost position of the chart.

11. An apparatus of the character described comprising a drift recording mechanism comprising a punching instrument, means acting to maintain the punching instrument in vertical position when within a drill pipe, and a chart above the punching instrument having a rod movable vertically to cause the chart to engage or disengage the punching instrument, a spring for urging the chart and rod downwardly into engagement with the punching instrument, a keeper member on the rod, pawls mounted adjacent the rod to engage the keeper and maintain the chart out of engagement with said instrument, an actuator engageable with said pawls to move the latter out of engagement with said keeper for releasing said rod, a spring for urging the actuator downwardly said instrument being so positioned in respect to the chart that when the chart is engaged by the instrument said urging means is still under tension to prevent relative movement of the chart and instrument.

12. An apparatus of the character described comprising a drift recording mechanism including a punching instrument having a weight associated therewith so as to maintain a vertical position, and a chart which said instrument is adapted to punch, means for supporting the chart for movement toward and away from the instrument, means tending to urge the chart into engagement with the instrument, releasable means for restraining the last means to maintain the chart out of engagement with the instrument, and a means for actuating said releasable means to release said chart and thereby permit said urging means to project the chart into engagement with the instrument, comprising a plunger, a spring engaging the plunger for urging the latter so that when the plunger is forced upward said spring will be compressed.

13. An apparatus as embodied in claim 11 wherein the pawl and rachet embodies a pair of pawls so positioned in relation to the rachet teeth that irrespective of the circumferential position of the rachet either one pawl or the other is in full engagement with a tooth.

14. An apparatus of the character described, comprising a drift recording mechanism having a punching element and a chart element, means associated with the punching instrument for maintaining it in vertical position, one of said elements being movable toward and away from the other element, means for biasing the said movable element into engagement with the other element, means for latching the said movable element to restrain it from occupying the biased position, and time controlled means for actuating the latching means to release said element and thus permit the two elements to engage each other and punch the chart.

FRANK S. BUNKER.